(12) United States Patent  
Yanase et al.

(10) Patent No.: US 6,459,166 B2
(45) Date of Patent: Oct. 1, 2002

(54) WARM-UP CONTROL DEVICE OF HYBRID ELECTRIC VEHICLE

(75) Inventors: Takashi Yanase; Makoto Ogata, both of Kanagawa (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 24 days.

(21) Appl. No.: 09/784,037

(22) Filed: Feb. 16, 2001

(30) Foreign Application Priority Data

Feb. 16, 2000 (JP) ........................................ 2000-038602

(51) Int. Cl.$^7$ ................................................ F02N 11/06
(52) U.S. Cl. ................ 290/40 C; 180/65.2; 123/179.28
(58) Field of Search ............................ 290/40 A, 40 B, 290/40 C, 40 R; 180/65.2; 123/179.28

(56) References Cited

U.S. PATENT DOCUMENTS

| 4,489,242 A | * | 12/1984 | Worst ................ 123/142.5 E |
| 5,075,616 A | * | 12/1991 | Mitsui ..................... 290/38 R |
| 5,461,289 A | | 10/1995 | Adler et al. ................. 318/139 |
| 5,788,004 A | | 8/1998 | Friedmann et al. ......... 180/65.2 |
| 6,018,199 A | * | 1/2000 | Shiroyama et al. ...... 123/179.3 |
| 6,032,753 A | * | 3/2000 | Yamazaki et al. ........... 180/309 |
| 6,057,605 A | * | 5/2000 | Bourne et al. ............ 290/40 A |
| 6,373,206 B1 | * | 4/2002 | Morimoto et al. ....... 123/179.1 |
| 2001/0040061 A1 | * | 11/2001 | Matuda et al. ............. 180/68.2 |

FOREIGN PATENT DOCUMENTS

| DE | 4133059 A | 4/1993 |
| DE | 19505431 A | 8/1996 |
| EP | 0698520 A | 2/1996 |
| JP | 5-328528 A | 12/1993 |

* cited by examiner

Primary Examiner—Nicholas Ponomarenko

(57) ABSTRACT

The invention provides a warm-up control device of a hybrid electric vehicle, which warms up an engine for generator while extending the life of the engine and improves the quietness. If an engine temperature is not greater than a set temperature after the start of the engine for generator, the warm-up control device controls a load of the generator and controls an engine output in accordance with the load of the generator so as to maintain an engine revolution speed at a predetermined low revolution speed.

10 Claims, 3 Drawing Sheets

S16 APPLY SMALL POWER GENERATION LOAD (FIRST LOAD SET)
S20 APPLY MEDIUM POWER GENERATION LOAD (SECOND SET LOAD)
S24 FINISH APPLYING POWER GENERATION TORQUE

WARM-UP CONTROL DEVICE OF HYBRID ELECTRIC VEHICLE

BACKGROUND OF THE INVENTION

Applicant's hereby claim the right of priority, under 35 U.S.C. § 119, based on Japanese Application No. 2000-38602, filed on Feb. 16, 2000, the entire contents of which are hereby incorporated by reference.

1. Field of the Invention

The present invention generally relates to a hybrid electric vehicle, and more particularly to a technique for warming up an engine for driving a generator in such a vehicle.

2. Description of Related Art

In recent years, there has been developed a series hybrid vehicle, that is a vehicle equipped with a motor as a source of driving force for the vehicle and a secondary battery, which supplies power to the motor, that is charged by a generator driven by a relatively-small engine. Normally, the series hybrid vehicle operates the engine to run the generator in order to charge the battery if a charging level (SOC: state of charge) of the battery is low.

In general, the series hybrid vehicle, however, does not always charge the battery while the vehicle is running, but charges the battery if the engine is cold after being static for a long period of time. Therefore, if the engine is cold and a large amount of power is required to be generated, the forcible increase in an engine output increases fuel consumption causing a deterioration in fuel economy and also increases oil consumption. This shortens the life of the engine.

To address this problem, Japanese Patent Provisional Publication No. 5-328528 discloses a device, which raises an engine revolution speed to warm up an engine used to drive a generator when the engine is cold.

The rise in the engine revolution speed as disclosed in the above publication, however, results in the increase in noise and vibration. Moreover, if the engine is cold and is not completely smooth, the rise in the engine revolution speed results in the damage on each sliding part of the engine. The increase in the noise and vibration and the damage on each sliding part shorten the life of the engine.

SUMMARY OF THE INVENTION

It is therefore an object of the present invention to provide a warm-up control device of a hybrid electric vehicle, which warms up an engine used to drive a generator while extending the life of the engine and improving the quietness.

The above object can be accomplished by providing a hybrid electric vehicle comprising: a generator being rotated by a driving force of an engine to generate power and supply the power to a battery or a motor; a temperature sensing device for sensing a temperature of the engine; and a warm-up control device for controlling a load of the generator and an output of the engine so as to maintain a revolution speed of the engine at a predetermined revolution speed, if the temperature of the engine sensed by the temperature sensing device is not greater than a set temperature.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of the present invention will be described hereinbelow.

Figure 1:
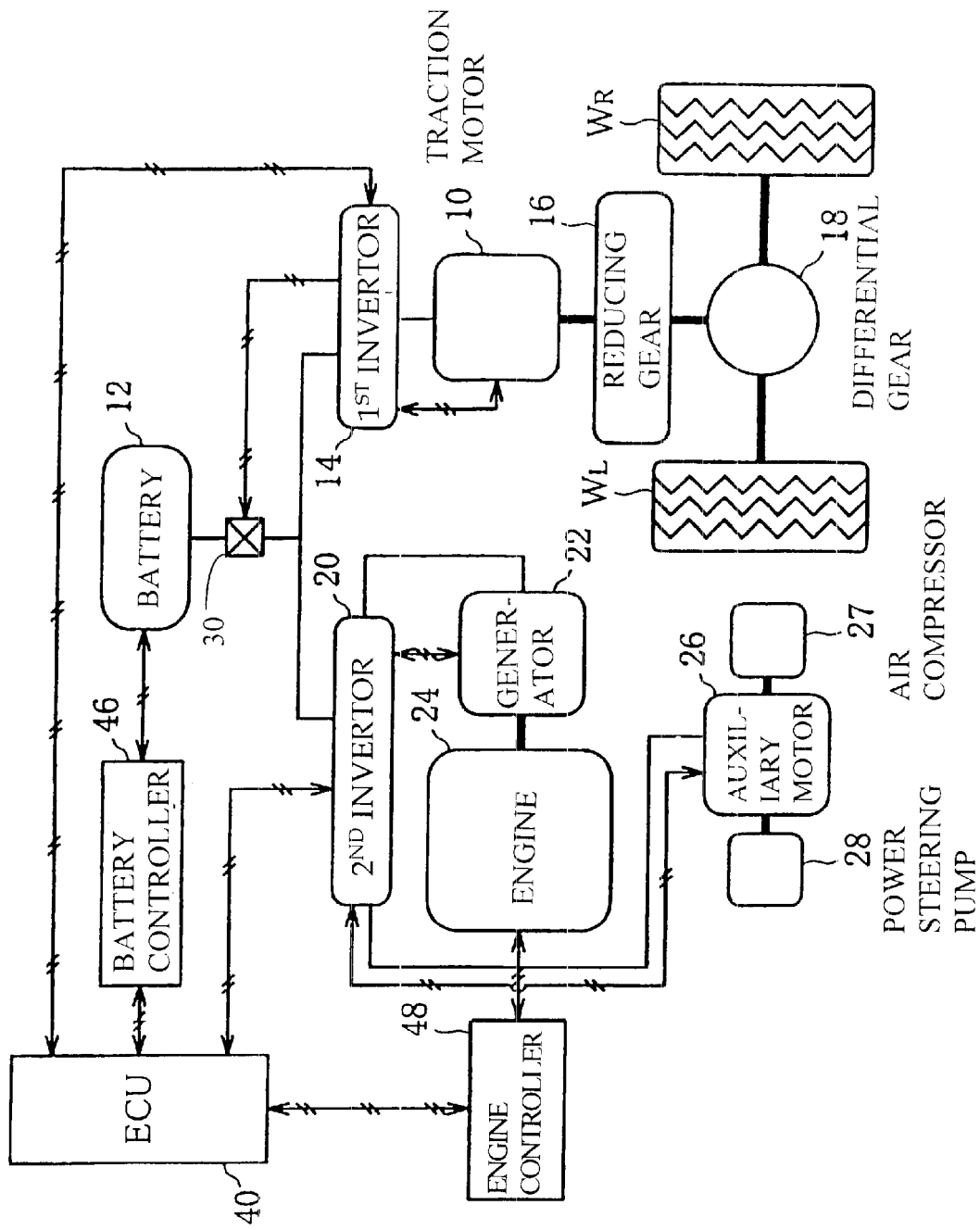
FIG. 1 is a schematic diagram showing a series hybrid vehicle, to which a warm-up control device of a hybrid electric vehicle according to the present invention is applied.

FIG. 1 is a schematic diagram showing a series hybrid vehicle, to which a warm-up control device of a hybrid electric vehicle according to the present invention is applied. With reference to FIG. 1, there will now be described the structure of the warm-up control device of the hybrid electric vehicle according to the present invention. For example, a large vehicle such as an omnibus, which runs at a low speed in a city, can be such a series hybrid vehicle.

As shown in FIG. 1, the series hybrid vehicle is equipped with a traction motor 10 as a source of driving force. The traction motor 10 is electrically connected to a high-voltage secondary battery 12, which supplies power, through a first inverter 14. The traction motor 10 is an induction motor, but may also be a permanent electromagnet synchronous type motor.

When the vehicle is braked, the traction motor 10 functions as an energy regenerative brake, i.e., a generator that utilizes braking energy. More specifically, when a driver of the vehicle operates a brake (not shown), the traction motor 10 generates a braking force and power at the same time. The generated power is charged in the battery 12. The first inverter 14 supplies stable power to the traction motor 10 by adjusting a voltage and a current supplied from the battery 12 or a later-described generator 22, or supplies stable power to the battery 12 by adjusting a voltage and a current generated by the traction motor 10.

As shown in FIG. 1, a pair of driving wheels WR, WL is connected to a rotary shaft of the traction motor 10 through reduction gears 16 and a differential gear 18. The reduction gears 16 are not necessarily always provided. The battery 12 and the first inverter 14 are electrically connected to the generator 22 through a second inverter 20. A rotary shaft of the generator 22 is connected to an output shaft of an engine 24, which is an internal combustion engine for driving the generator. The generator 22 is a permanent electromagnet type generator but may be of any suitable type.

The second inverter 20 is also electrically connected to an auxiliary motor 26, which drives auxiliaries such as an air compressor 27 for an air brake and a power steering pump 28. As is the case with the first inverter 14, the second inverter 20 supplies stable power to the battery 12 or the traction motor 10 by adjusting a voltage and a current generated by the generator 22, or supplies stable power to the auxiliary motor 26 by adjusting the voltage and the current from the battery 12. The inverter 20 also has a function of adjusting the voltage and the current from the battery 12 and supplying them to the generator 22.

A relay fuse 30 is mounted between the battery 12 and the first and second inverters 14, 20. The relay fuse 30 is electrically connected to the inverter 14, and allows a current to flow from the battery 12 to the traction motor 10 or prevents an excessive current from flowing from the battery 12 to the traction motor 10 in accordance with information from the inverter 14. The relay fuse 30 also has a function of preventing the generator 22 or traction motor 10 during regenerative braking (the engine regeneration) from excessively charging the battery 12.

As shown in FIG. 1, the battery 12 and the first and second inverters 14, 20 are electrically connected to an electronic control unit (ECU) 40 so that the battery 12 and the first and second inverters 14, 20 can communicate with the ECU 40. The first inverter 14 and the second inverter 20 are electrically connected to the traction motor 10 and the generator 22, respectively, so that they can communicate with one another. The ECU 40 is connected to a battery controller 46, which monitors a charging level (SOC: state of charging), etc. of the battery 12, and an engine controller 48, which controls the operation of the engine 24. The engine controller 48 also has a function of sensing an engine revolution speed Ne and sensing an engine temperature Te from a coolant temperature of the engine 24 by a suitable temperature sensing device (not shown).

In the hybrid vehicle that is constructed in the above-mentioned manner, a required motor torque signal corresponding to a control input of an accelerator pedal (not shown) is supplied to the first inverter 14 while the vehicle is running. In accordance with the signal, the first inverter 14 adjusts the voltage and the current from the battery 12, and therefore, the traction motor 10 generates a desired motor torque. If the battery controller 46 senses a drop in the SOC of the battery 12, the engine controller 48 starts the engine 24 to operate the generator 22, which generates power to charge the battery 12 in accordance with the SOC. If the SOC of the battery 12 is low, the power equivalent to a power consumption of the traction motor 10 is directly fed from the generator 22 to the traction motor 10 so that the surplus power from the generator 22 can be charged in the battery 12.

If, for example, a brake pedal (not shown) is operated to brake the vehicle and the control input of the accelerator pedal is zero, the traction motor 10 performs regenerative braking and generates power to charge the battery 12. While the vehicle is running, the power from the battery 12 appropriately runs the auxiliary motor 26 in order to drive the auxiliaries such as the compressor 27 and the power steering pump 28.

If the SOC of the battery 12 is decreased, the engine 24 is started to cause the generator 22 to generate power as stated above. If, however, the engine 24 is static for a long period of time, the engine 24 becomes cold. Thus, the engine 24 must be warmed up in order to acquire a stable output. There will now be described the operation of the warm-up control device in the hybrid electric vehicle, i.e., the warm-up control for the engine 24.

Figure 2:
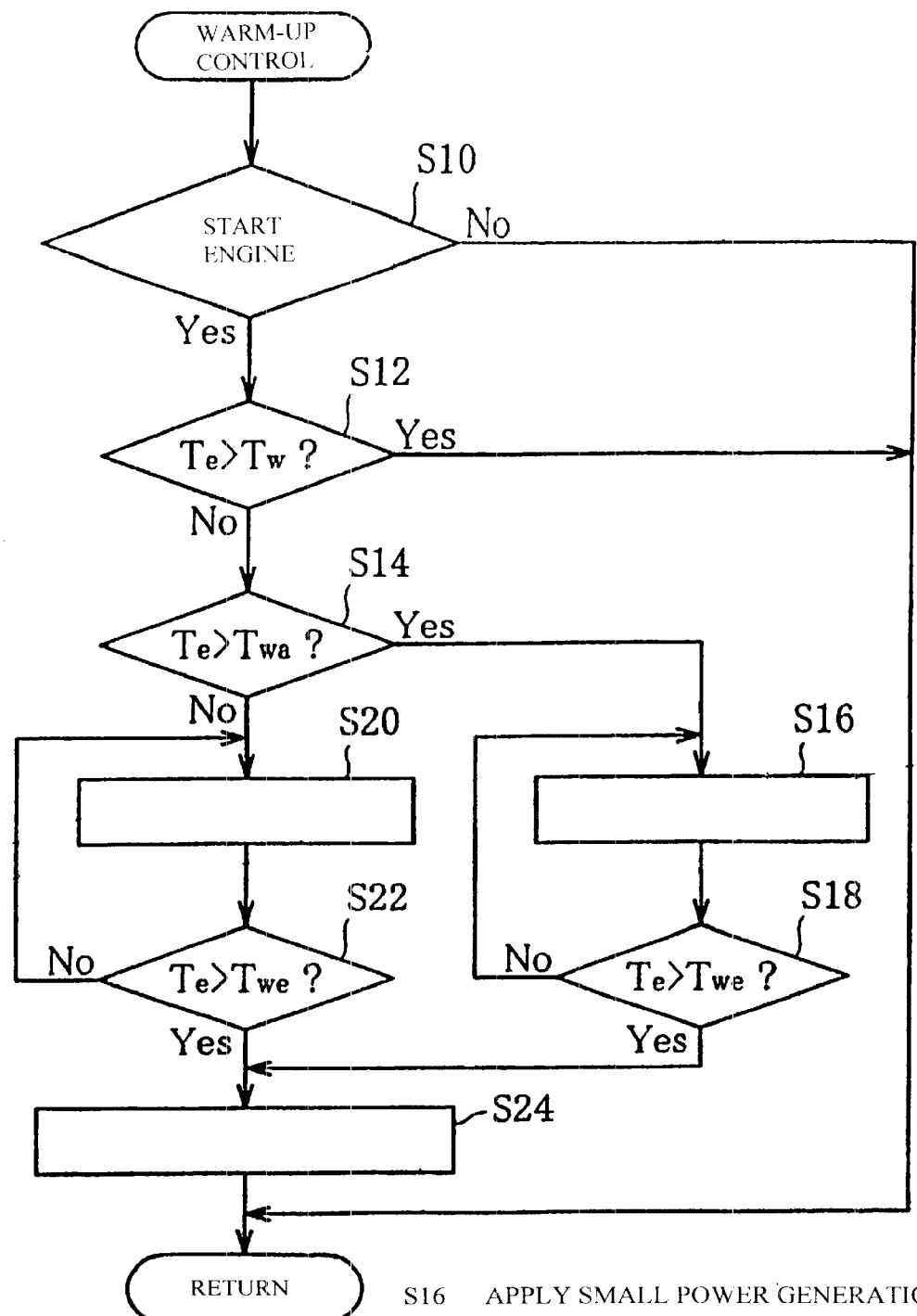
FIG. 2 is a flow chart showing a control routine of a warm-up control according to the present invention.

FIG. 2 is a flow chart showing a control routine of the warm-up control according to the present invention, which is executed by the ECU 40. A description will hereunder be given with reference to the flow chart. When a drop in the SOC of the battery 12 is sensed in accordance with the information from the battery controller 46, the engine controller 48 starts the engine 24. First, it is determined in a step S10 whether the engine 24 has been started or not in accordance with the information from the engine controller 48. If Yes, the process goes to a step S12.

In the step S12, it is determined whether the engine temperature Te is higher than a preset temperature (Tw) (Te>Tw) or not in accordance with the engine temperature information Te from the engine controller 48. If Yes, the process goes out of the routine. If No, the process goes to a step S14.

In the step S14, it is determined whether the engine temperature Te is higher than a first preset first temperature Twa (Twa<Tw) (Te<Twa) or not. If Yes, i.e., the engine temperature Te is determined as being higher than the first preset temperature Twa and being not greater than the set temperature Tw, the process goes to a step S16.

In the step S16, a small power generation load is applied. More specifically, a load equivalent to a small power generation (the first set load) is applied to the engine 24 to thereby warm up the engine 24. In more detail, the small power generation load (the first set load) is applied to the generator 22 in order to cause the generator 22 to generate a small amount of power. On the other hand, the engine controller 48 issues an engine output command to the engine 24 in order to maintain the engine revolution speed Ne at a predetermine low revolution speed Ne1 (e.g., 500 rpm) against the small power generation load (the first set load) of the generator 22. More specifically, fuel injection information is supplied to a fuel injection valve (not shown) of the engine 24 in order to make it possible to maintain the engine revolution speed Ne at the predetermined low revolution speed Ne1 against the small power generation load (the first set load) of the generator 22.

Therefore, the engine 24 injects a larger quantity of fuel from the fuel injection valve than fuel required for operating the unloaded generator 22 to thereby achieve an engine output in opposition to the small power generation load (the first set load) of the generator 22 although the engine revolution speed Ne is as low as the predetermined low revolution speed Ne1. This generates a large amount of combustion heat, and facilitates the warm-up of the engine 24. More specifically, loading the generator 22 makes it possible to warm up the engine 24 more quickly within a shorter period than in the case where the unloaded generator 22 is operated. In this case, there is no necessity of raising the engine revolution speed Ne.

If the engine revolution speed Ne is maintained at the predetermined low revolution speed Ne1 (e.g., 500 rpm) during the warm-up of the engine 24, the engine 24 can be kept quiet with reduced noise and vibration. Moreover, it is possible to prevent each sliding part of the engine 24 from being damaged by the increase in the engine revolution speed in the case where the engine 24 is cold and is not completely smooth. This extends the life of the engine 24.

More specifically, the warm-up control device of the present invention can warm up the engine 24 while extending the life of the engine 24. In a next step S18, it is determined whether or not the engine temperature Te is higher than a second predetermined temperature Twe (Twe>Tw) preset as a warm-up completion temperature (Te>Twe). If No, the warm-up of the engine 24 is continued in the step S16. If Yes, the process goes to a step S24 where it is determined that the warm-up is completed and the application of the power generation load is finished.

If No, i.e., it is determined in the step S14 that the engine temperature Te is not greater than the first predetermined temperature and the engine 24 is quite cold, the process goes to a step S20. In the step S20, a medium power generation load (the second set load) is applied. More specifically, a load equivalent to a medium power generation (the second set load) is applied to the engine 24 to thereby warm up the engine 24.

In more detail, as is the case with the application of the small power generation load, the medium power generation load (the second set load) higher than the small power generation load (the first set load) is applied to the generator 22 to cause the generator 22 to generate medium power. On the other hand, the engine controller 48 issues an engine output command to the engine 24 in order to maintain the engine revolution speed Ne at a predetermine low revolution speed Ne1 (e.g., 500 rpm) against the medium power generation load (the second set load). More specifically, fuel injection information is supplied to a fuel injection valve (not shown) of the engine 24 in order to make it possible to maintain the engine revolution speed Ne at the predetermined low revolution speed Ne1 against the medium power generation load (the second set load) of the generator 22.

Figure 3:
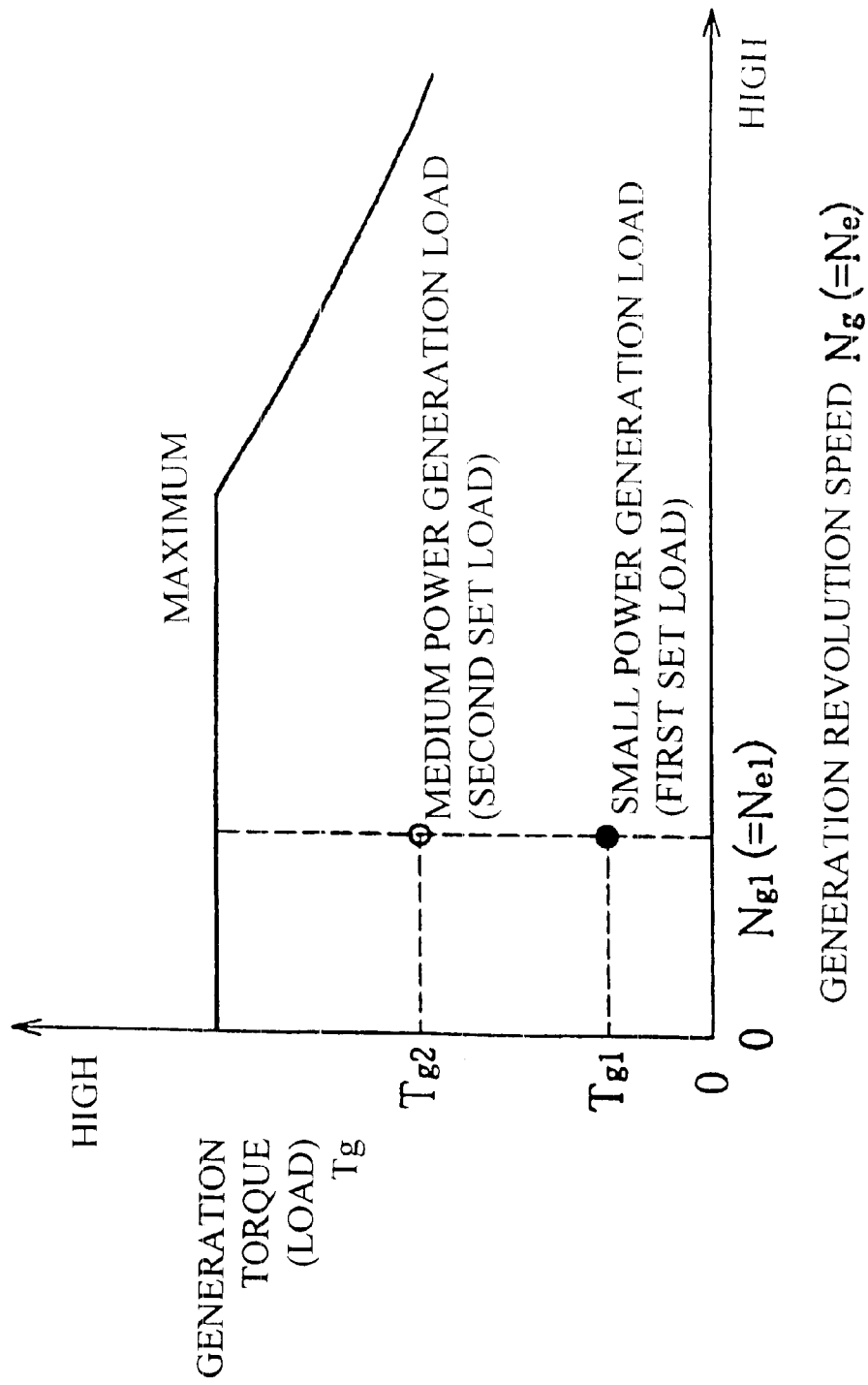
FIG. 3 is a drawing showing a relationship between a generator revolution speed Ng (=Ne) and a generated torque Tg, i.e., load, and showing a relationship between a load equivalent to a small power generation (the first set load Tg1: black circle) and a load equivalent to a medium power generation (the second set load Tg2: white circle).

FIG. 3 shows the relationship between a generator revolution speed Ng (=Ne) and a generation torque Tg of the generator 22 or a load. If the load (the second set load) equivalent to the medium power generation is applied to the engine 24, the medium power generation load (the second set load Tg2: white circle) higher than the small power generation load (the first set load Tg1: black circle) is applied to the generator 22. The engine 24 is controlled so as to maintain the generator revolution speed Ng (=Ne) at the predetermined low revolution speed Ng1 (=Ne1:- 500 rpm).

Therefore, the engine 24 injects a larger quantity of fuel from the fuel injection valve than fuel required for operating the unloaded generator 22 to thereby achieve an engine output in opposition to the medium power generation load (the second set load) of the generator 22 although the engine revolution speed Ne is as low as the predetermined low revolution speed Ne1. This generates a large amount of combustion heat, and facilitates the warm-up of the engine 24.

More specifically, the medium power generation (the second set load) higher than the small power generation (the first set load) is applied to the generator 22, and the engine 24 is controlled so as to maintain the engine revolution speed Ne at the predetermined low revolution speed Ne1. This makes it possible to warm up the engine 24 more quickly within a shorter period than in the case where the generator 22 with the small power generation load (the first set load) is operated. At the same time, it is possible to maintain the quietness of the engine 24 and extend the life of the engine 24.

As is the case with the step S18, it is determined in a step S22 whether the engine temperature Te is higher than the second predetermined temperature Twe (Te>Twe) or not. If No, the warm-up of the engine 24 is continued in the step S20. If Yes, the process goes to the step S24 where it is determined that the warm-up is completed. Accordingly, the application of the power generation load is finished.

If the warm-up of the engine 24 is completed, the engine revolution speed Ne is raised from the predetermined revolution speed Ne1 as is normal to cause the generator 22 to start generating the power.

According to the above embodiment, the load of the generator 22 can be divided into the following two stages: the small power generation load equivalent to the small power generation the first set load) and the medium power generation load equivalent to the medium power generation (the second set load). The present invention, however, should not be restricted to this. For example, the load of the generator 22 may be changed in a plurality of stages according to the engine temperature Te, and accordingly, the engine 24 may be controlled so as to maintain the engine revolution speed Ne at the predetermined low revolution speed Ne1.

According to the above embodiment, whether the engine is cold or not is determined according to the engine temperature. The present invention, however, should not be restricted to this. For example, whether the engine is cold or not may be determined according to a period from the stop to the start of the engine.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A hybrid electric vehicle comprising:

a generator being rotated by a driving force of an engine to generate power and supply the power to a battery or a motor;

a temperature sensing device for sensing a temperature of said engine; and a warm-up control device for controlling a load of said generator and an output of said engine so as to maintain a revolution speed of said engine at a predetermined revolution speed, if the temperature of said engine sensed by said temperature sensing device is not greater than a set temperature.

2. A hybrid electric vehicle according to claim 1, wherein:

said warm-up control device changes the load of said generator according to the temperature sensed by said temperature sensing device.

3. A hybrid electric vehicle according to claim 1, wherein:

said warm-up control device increases the load of said generator as the temperature sensed by said temperature sensing device is lowered.

4. A hybrid electric vehicle according to claim 1, wherein:

said warm-up control device has a first set load and a second set load higher than said first set load in order to change the load of said generator, and determines which of said set loads is to be applied to said generator according to the temperature sensed by said temperature sensing device.

5. A hybrid electric vehicle according to claim 4, wherein:

if the temperature sensed by said temperature sensing device is higher than a first predetermined temperature lower than said set temperature, said warm-up control device changes the load of said generator to said first set load; and if the temperature sensed by said temperature sensing device is lower than said first predetermined temperature, said warm-up control device changes the load of said generator to said second set load.

6. A hybrid electric vehicle according to claim 1, wherein:

said warm-up control device finishes controlling the load of said generator and the output of said engine when the temperature sensed by said temperature sensing device exceeds a second preset temperature higher than said set temperature.

7. A hybrid electric vehicle comprising:

a generator being rotated by a driving force of an engine to generate power and supply the power to a battery or a motor; and a warm-up control device for increasing a load of said generator and controlling an output of said engine so as to maintain a revolution speed of said engine at a predetermined revolution speed after starting said engine in a cold state.

8. A method for warming up an engine from a cold state in a hybrid drive system wherein the engine drives an electric generator, comprising the steps of:

sensing a condition indicative of said engine being in a cold state; starting said engine and bringing the revolution speed of said engine to a predetermined minimum level;

placing a predetermined load on said generator; and maintaining said predetermined minimum level of revolution speed on said engine against said predetermined load on said generator to reduce time and engine noise associated with engine warm-up.

9. The method of claim 8, including the further steps of sensing a second condition indicative of a warmed-up state of said engine; and removing the constraints placed upon said engine revolution speed and generator load during engine warm-up.

10. The method of claim 8, wherein said engine has a plurality of cold states; and said generator has a like plurality of loads selectively associated with a respective cold state to optimize the warm-up of said engine.

* * * * *